No. 721,614. PATENTED FEB. 24, 1903.
W. A. SMITH.
ANIMAL TRAP.
APPLICATION FILED SEPT. 18, 1902.
NO MODEL.
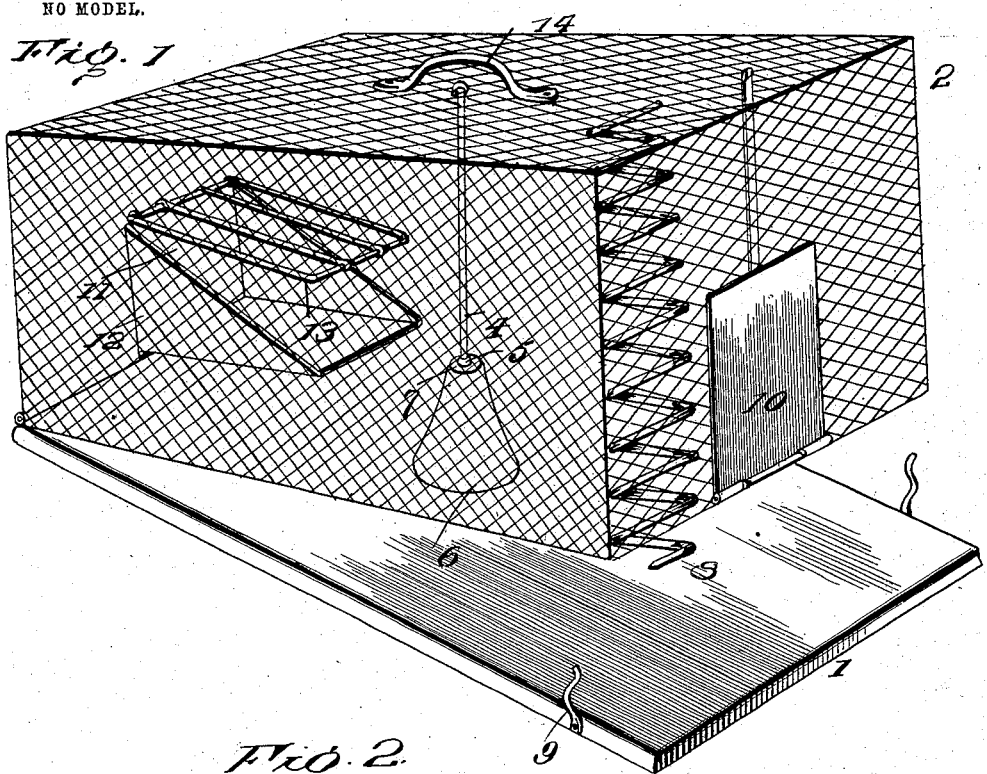
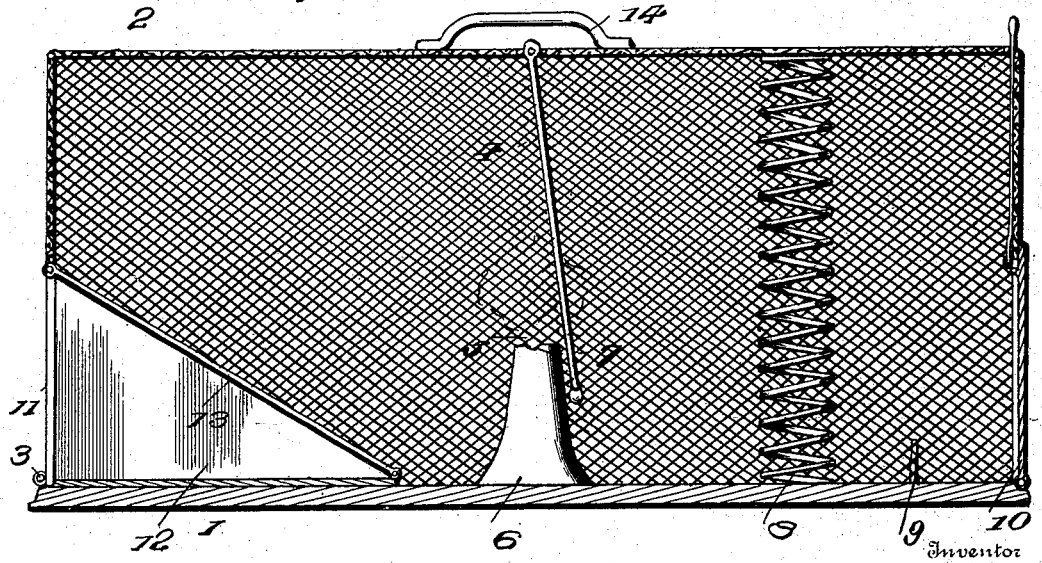
Witnesses
Gladys L. Thompson
Inventor
W. A. Smith
By R. A. Lacey
Attorneys

UNITED STATES PATENT OFFICE.

WILLIAM ALBERT SMITH, OF COSHOCTON, OHIO.

ANIMAL-TRAP.

SPECIFICATION forming part of Letters Patent No. 721,614, dated February 24, 1903.

Application filed September 18, 1902. Serial No. 123,919. (No model.)

*To all whom it may concern:*

Be it known that I, WILLIAM ALBERT SMITH, a citizen of the United States, residing at Coshocton, in the county of Coshocton and State of Ohio, have invented certain new and useful Improvements in Animal-Traps, of which the following is a specification.

This invention is designed especially to provide a substitute construction for the common form of animal-traps at present in use, and embodies advantages as to details of structure, which will be more fully dwelt upon hereinafter and finally claimed.

In the ordinary form of trap in which the entrance is usually confined to a small opening or series of openings the suspicions of the animal are often aroused, and owing to this the efficiency of the device is such that its utility for the purposes desired is entirely destroyed. The above defect is remedied by the trap employed by me, the bait being disposed in such a manner that a natural state of affairs is apparently presented to the animal, thus making him devoid of all suspicion, as above described.

For a full description of the invention and the merits thereof and also to acquire a knowledge of the details of construction of the means for effecting the result reference is to be had to the following description and to drawings hereto attached.

While the essential and characteristic features of the invention are susceptible of modification, still the preferred embodiment of the invention is illustrated in the accompanying drawings, in which—

Figure 1 is a perspective view of an animal-trap embodying the essential features of the invention. Fig. 2 is a longitudinal section.

Corresponding and like parts are referred to in the following description and indicated in both views of the drawings by the same reference characters.

In the preferred construction thereof my trap comprises three essential parts—namely, a base 1, a cage or body portion 2, and means consisting of a trip or trigger device for closing the trap and confining the animal.

Minutely describing the parts and their appurtenances, the base 1 may be of any suitable form as to shape, being oblong as illustrated. The cage proper is pivotally connected to the said base by hinges or other means found desirable by the inventor in the manufacture of the article and is preferably made of wire-netting or spaced wires, the whole structure as to material, however, being dependent upon the character of work for which the trap is intended, whether or not it is used in catching large or small animals. The cage in its normal condition when in use is raised from the base and maintained in this position by a brace-rod 4, which constitutes a trigger. The trigger 4 is suspended pivotally from the upper portion of the cage and at about the central portion thereof, it being desired that the animal be well within the trap when the same closes. The lower end 5 of the trigger is to be baited and rests upon a stool 6, projected from the base 1. The upper surface of the said stool may have a depression 7 thereon to more readily hold the trigger 4 in position and prevent the same from slipping on account of a slight jar or like cause. The stool 6 is of conical shape and tapers slightly toward the upper end. A retracting-spring 8, secured at its upper end to the cage and to the base 1 at its lower end, serves to quickly close the former upon the latter when the trigger 4 is tripped. Spring-catches 9 hold the cage locked to the base after the aforesaid trigger action and after the animal has been caught. A door 10, hinged to the cage, permits of withdrawal of the trapped animals. It will be understood, however, that this door need not be used except when it is desired to let the animal pass from the cage through a single opening, since the body 2 may be raised and utilized for the same purpose.

It is proposed within the contemplation of the invention that a single animal shall be entrapped and used to entice others into the cage, and in order to accomplish this an opening 11 is provided in a side of the cage 2, said opening having a guard 12 thereabout. A gravity-closing door 13 coöperates with said guard to close the opening in a manner which will be easily understood. The first animal entrapped by the closing down of the case 2 upon the base 1, actuated by the tripping of the trigger or supporting-rod 4, entices others through the opening 11. The door 13 and guard being of the peculiar construction set forth permits of the entrance of other animals, but owing to the fact that it cannot be opened from the inner side of the cage prevents escape. Any desirable construction of securing means for the door 10 may be used. To facilitate and enable ready removal of the device from place to place, a handle 14 is pivoted to the upper portion of the trap.

I am not to be restricted to the exact construction of the trap as illustrated in the drawings, but reserve the right to make same of any material and size found suitable for the various purposes to which it is adapted and to modify the construction of the elemental parts, structurally speaking, in accordance with the spirit of the invention and the scope of the hereto-appended claims.

The stool 6 may be rigidly secured to the base of the trap or loosely disposed upon the said base. The size of the trap would be a consideration in adopting either of the said forms of structure.

Having thus described the invention, what is claimed as new is—

1. In an animal-trap, a base, a cage pivoted thereto, a brace-rod or trigger pivoted to the top of the cage for supporting same in an upraised position, a stool disposed upon the aforesaid base, the lower end of the trigger being adapted to rest upon said stool to hold the cage open and to be tripped from such position by application of pressure from any direction to cause closing down of the cage, substantially as described.

2. In an animal-trap comprising a base and a cage pivoted thereon, a trigger pivoted to the top of the cage, a stool loosely disposed upon the base and adapted to coöperate with the lower end of the trigger to hold the cage in an upraised position, said end of the trigger resting thereon, the trigger being adapted to be tripped from its supporting position by pressure from any direction, the stool also being adapted to be displaced by application of such pressure, substantially as described.

3. In an animal-trap, a rectangular base, a rectangular cage pivoted to one end of the said base, a stool disposed about centrally upon the base and a trigger pivoted to the top of the cage and adapted to have its lower end rest upon the stool to sustain the cage in an upraised position, said trigger also being adapted to be tripped from the stool upon exercise of pressure from any direction to cause closing down of the cage-body, spring-catches located upon opposite sides of the base and adapted to interlock with the sides of the cage to secure same to the base upon closing down thereof, a guarded inlet-opening located in the side of the cage at the hinged end, and a gravity-closing door pivoted to the upper portion of the said opening, an outlet-opening at the end of the cage opposite the aforementioned inlet-opening and having a door so as to normally close same, and a coil-spring connected to the top of the cage and base of the trap to facilitate closing down of the former upon the latter, substantially as described.

In testimony whereof I affix my signature in presence of two witnesses.

WILLIAM ALBERT SMITH. [L. S.]

Witnesses:
LORA SMITH,
FRANK E. POMERENE.